United States Patent
Shih-Yu et al.

(10) Patent No.: US 7,315,415 B2
(45) Date of Patent: Jan. 1, 2008

(54) INTERPUPILLARY DISTANCE ADJUSTMENT MECHANISM FOR OPTICAL DEVICE

(75) Inventors: Pai Shih-Yu, Taichung (TW); Lai Hsiang-Yi, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/369,707

(22) Filed: Mar. 7, 2006

(65) Prior Publication Data

US 2006/0221442 A1    Oct. 5, 2006

(30) Foreign Application Priority Data

Apr. 1, 2005    (TW) .............................. 94110651 A

(51) Int. Cl.
G02B 23/00    (2006.01)
G02B 27/02    (2006.01)

(52) U.S. Cl. ...................... 359/412; 359/407; 359/480

(58) Field of Classification Search ........ 359/480–482, 359/813–814, 404–420, 819–824
See application file for complete search history.

(56) References Cited

U.S. PATENT DOCUMENTS

| | | | |
|---|---|---|---|
| 4,936,667 A * | 6/1990 | Rohr et al. .................. | 359/480 |
| 5,335,110 A * | 8/1994 | Shin ............................ | 359/480 |
| 5,444,568 A | 8/1995 | Williams, Jr. et al. ....... | 359/400 |
| 5,633,753 A | 5/1997 | Fantone et al. ............. | 359/412 |
| 5,729,384 A * | 3/1998 | Nishitani et al. ........... | 359/412 |
| 5,734,499 A | 3/1998 | Matsumoto et al. ........ | 359/417 |
| 5,896,209 A * | 4/1999 | Funatsu ...................... | 359/417 |
| 5,973,830 A | 10/1999 | Ichikawa .................... | 359/415 |
| 6,172,808 B1 * | 1/2001 | Foreman et al. ............ | 359/481 |
| 6,175,447 B1 * | 1/2001 | Koide et al. ................. | 359/417 |
| 6,236,504 B1 | 5/2001 | Kao et al. .................... | 359/412 |
| 6,333,814 B1 * | 12/2001 | Chang et al. ................ | 359/411 |
| 6,485,143 B2 * | 11/2002 | Buettgenbach .............. | 359/399 |
| 6,667,833 B1 | 12/2003 | Fay ............................. | 359/411 |
| 6,704,141 B1 * | 3/2004 | Nowak et al. .............. | 359/411 |
| 6,879,443 B2 * | 4/2005 | Spitzer et al. .............. | 359/630 |

* cited by examiner

*Primary Examiner*—Thong Q Nguyen

(57) ABSTRACT

An interpupillary distance adjustment mechanism for an optical device includes a slide rail (1) mounted on a middle support of the optical device, two slide blocks (2) mounted on respective lens barrels of the optical device, and a blocking member (4, 4'). The two slide blocks are slidably movable relative to the slide rail toward or away from each other to change the distance between the two lens barrels of the optical device. The blocking member is manually operable to provide an acting force between the slide block and the slide rail, and thus changing the friction force therebetween during sliding movement of the slide block. In this way, undesired sliding movement of the slide block relative to the slide rail can be prevented.

25 Claims, 3 Drawing Sheets

INTERPUPILLARY DISTANCE ADJUSTMENT MECHANISM FOR OPTICAL DEVICE

BACKGROUND OF THE INVENTION

1. Field of the Invention

The present invention relates to an interpupillary distance adjustment mechanism for an optical device, and particularly to an interpupillary distance adjustment mechanism that is manually operable during use of the optical device.

2. Description of Prior Art

A laser rangefinder is one of the main optical devices for distance measurement. A common type of laser rangefinder usually applies a laser emitter as a light source for transmitting a modulated laser light beam to a target object to be measured. The target object reflects and returns the laser light beam to a laser receiver. The distance to the target object is determined by multiplying the light velocity by the time interval between emission of the laser beam and the receipt of the reflected beam, and can be expressed as: $L=C*Td/2$, wherein "L" represents the distance between the target object and the laser rangefinder, "C" represents the light velocity, and "Td" is the time interval between the emission of the laser beam and the receipt of the reflected beam. Since the light velocity "C" is a constant, so long as the time interval "Td" between the emission of the laser beam and the receipt of the reflected beam is accurately measured, the accurate distance to the target object can be obtained.

Similar to telescopes, laser rangefinders are classified as monocular and binocular laser rangefinders. Generally, a monocular laser rangefinder is much less expensive, has higher magnification power, and can be hand-held or tripod mounted for viewing. However, the monocular laser rangefinder is generally very long in size, which is inconvenient for carry. Further, monocular viewing of the target object is much more tiring for the human eye than binocular viewing. In contrast, a binocular laser rangefinder allows the user to view binocularly, and can be made smaller for easy carrying and hand-held viewing. These make the binocular laser rangefinder more useful in various applications.

Since the eye separation in humans varies greatly, the binocular laser rangefinder necessitates mechanism for adjusting the difference in interpupillary distance. Conventionally, the interpupillary distance may be adjusted by swivel action to change the distance between two lens barrels, such as those disclosed in U.S. Pat. Nos. 5,973,830 and 6,667,833. Alternatively, the interpupillary distance may be adjusted by sliding and thus moving the two lens barrels toward or away from each other, such as those disclosed in U.S. Pat. Nos. 5,444,568, 5,633,753, 5,734,499, and 6,236,504.

The swivel action is generally applied to binocular telescopes. However, it has the disadvantage that miniaturization design is difficult.

Therefore, for compact designs, the sliding action is preferred. Whether the sliding action is smooth mainly depends on the torque of a slide rail, and the torque of the slide rail is generally adjusted by torque setting screws. By turning the torque setting screws inwards or outwards (tightening or loosening the screws), the torque of the slide rail is correspondingly increased or decreased. Generally, the torque set by the torque setting screws is generally factory set before the laser rangefinder is shipped to the sales points. However, after long time use, it is possible that the torque setting screws become loose. Consequently, the torque of the slide rail is decreased, and the two lens barrels may be caused to move relative to each other upon inclination, thereby resulting in undesired change of interpupillary distance. Therefore, in such a case, it is necessary for the user to manually adjust the torque of the slide rail. However, the torque setting screws are positioned inside of the laser rangefinder. This makes it difficult for the user to manually adjust the torque of the torque setting screw.

Accordingly, to overcome the above-mentioned disadvantages presented in the prior art, it is desired to provide an improved interpupillary distance adjustment mechanism for an optical device, such as a laser rangefinder.

SUMMARY OF THE INVENTION

The main object of the present invention is to provide an interpupillary distance adjustment mechanism for an optical device, especially for a laser rangefinder, which allows the user to manually adjust the distance between the lens barrels during use of the optical device, so as to accommodate different user interpupillary distances.

Another object of the present invention is to provide an interpupillary distance adjustment mechanism for an optical device, especially for a laser rangefinder, which allows the user to manually adjust the degree of looseness and tightness of the sliding movement of the lens barrels and to fix the distance between the lens barrels when viewing.

To achieve the above objects of the present invention, an interpupillary distance adjustment mechanism for an optical device in accordance with the present invention comprises a slide rail mounted on a middle support of the optical device, two slide blocks mounted on respective lens barrels of the optical device, and a blocking member. The two slide blocks are slidably movable relative to the slide rail toward or away from each other to change the distance between the two lens barrels of the optical device. The blocking member is manually operable to provide an acting force between one slide block and the slide rail and thus change the friction force therebetween during sliding movement of the slide block. In this way, undesired sliding movement of the slide block relative to the slide rail can be prevented.

In a first embodiment of the present invention, the blocking member is a friction block, which receives a pressing force exerted by the user to change the friction force between the slide block and the slide rail during sliding movement of the slide block.

In a second embodiment of the present invention, the blocking member consists of a magnet disposed above the slide rail and an interrupter movably disposed between the magnet and the slide rail. The magnet applies an attraction/expelling force to the slide rail to induce a resistance against movement of the slide blocks along the slide rail.

Alternatively, the interpupillary distance adjustment mechanism for an optical device in accordance with the present invention may also be configured to comprise a slide rail mounted on one lens barrel of the optical device, a slide block mounted on the other lens barrel of the optical device, and a blocking member. The slide block is slidably movable along the slide rail to change the distance between the two lens barrels of the optical device. The blocking member is manually operable to provide an acting force between the slide rail and the slide block and thus change the friction force therebetween during sliding movement of the slide block. In this way, undesired sliding movement of the slide block relative to the slide rail can be prevented.

By the relative movement between the slide rail and the slide block, the distance between the two lens barrels of the optical device can be changed, and thus different user interpupillary distances can be accommodated. By further employing a blocking member, which is in the form of a friction block or the combination of a magnet and an interrupter, to provide the normal force and thus adjust the friction force between the slide rail and the slide block during sliding movement of the slide block, further sliding movement of the slide block along the slide rail can be prevented. Accordingly, the distance between the lens barrels is fixed, and undesired movement of the lens barrels during viewing is thus efficiently prevented.

BRIEF DESCRIPTION OF THE DRAWINGS

The present invention may best be understood through the following description with reference to the accompanying drawings, in which.

DETAILED DESCRIPTION OF THE PREFERRED EMBODIMENTS

Figure 1:
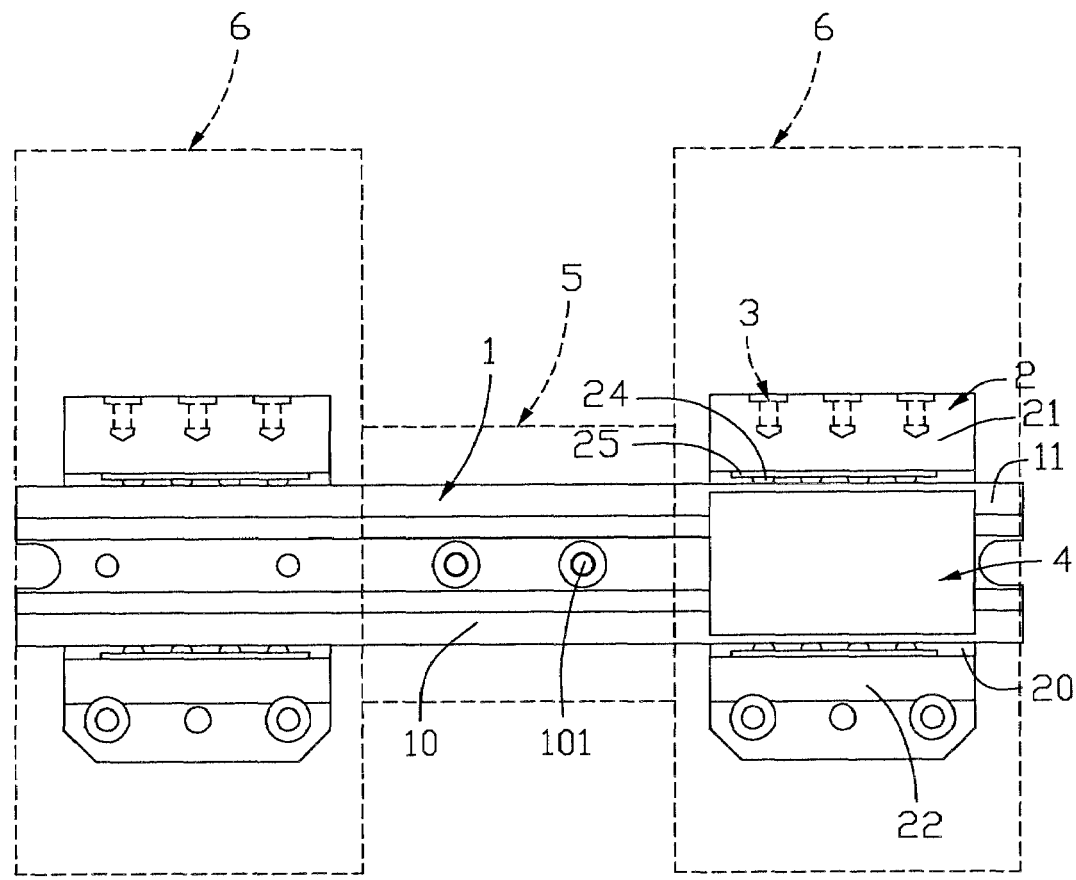
FIG. 1 is a top view showing an interpupillary distance adjustment mechanism for an optical device in accordance with a first embodiment of the present invention.
Figure 2:
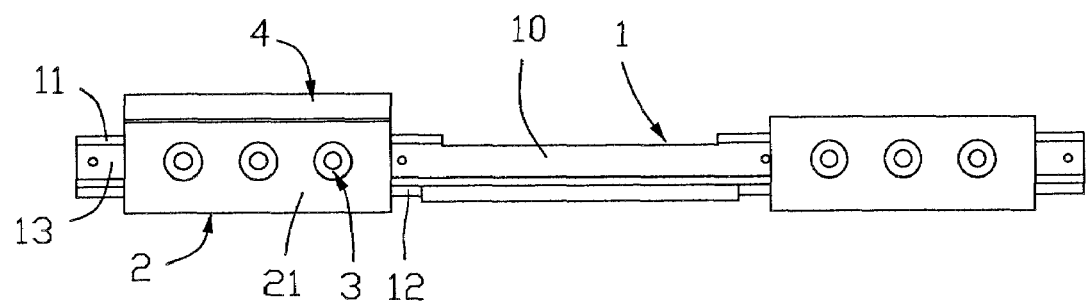
FIG. 2 is a side view of the interpupillary distance adjustment mechanism for an optical device in accordance with the first embodiment of the present invention.
Figure 3:
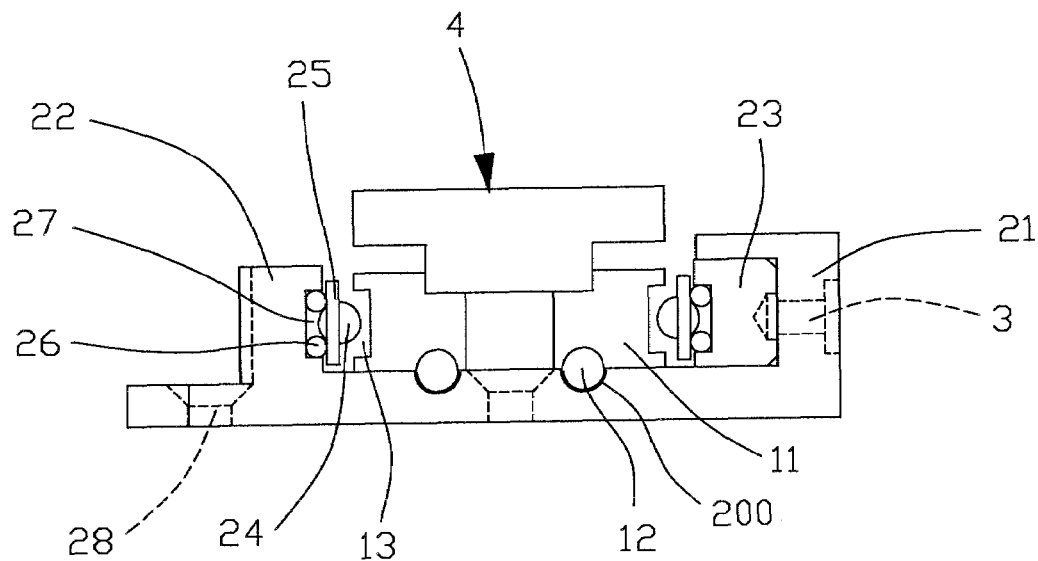
FIG. 3 is a side view of the interpupillary distance adjustment mechanism for an optical device in accordance with the first embodiment of the present invention.

Referring to FIG. 1, an interpupillary distance adjustment mechanism for an optical device in accordance with a first embodiment of the present invention comprises a slide rail 1, a pair of slide blocks 2 movably mounted on the slide rail 1, and a blocking member 4. The slide rail 1 comprises a middle mounting portion 10 and two track portions 11 at opposite ends of the mounting portion 10. Two mounting holes 101 are defined in the mounting portion 10 for extension of two screws therethrough, so as to mount the slide rail 1 on a middle support 5 (shown in dashed lines) of a binocular optical device. As clearly shown in FIGS. 2 and 3, a pair of cylindrical guide posts 12 is received in the bottom of each track portion 11 of the slide rail 1. A rectangular guide slot 13 is defined in each side of the track portion 11.

Each slide block 2, which is substantially U-shaped, comprises a recess 20 and a pair of side portions 21, 22 on opposite sides of the recess 20. A pair of receiving slots 200 (shown in FIG. 3) is located below the recess 20 for receiving corresponding guide posts 12 of the slide rail 1 therein. The inner side of the side portion 21 of each slide block 2 is recessed to receive an adjustment block 23 therein. A plurality of torque setting screws 3 is screwed through the side portion 21 to contact with the adjustment block 23. An engaging slot 27 is defined in sides an inner side of the side portion 22 of each slide block 2 and an inner side of each adjustment block 23. A pair of slide bars 26 is respectively received in upper and lower ends of each engaging slot 27. A positioning member 25 is positioned between the engaging slot 27 and the guide slot 13 of the guide rail 1. A plurality of rolling balls 24 is disposed in the positioning member 25 with one side thereof engaged between a corresponding pair of slide bars 26 and with the other side thereof received in a corresponding guide slot 13 of the slide rail 1. In such a way, each slide block 2 is retentively assembled to the slide rail 1, and can be slidably moved relative to the slide rail 1 along the guide posts 12 and the guide slots 13. By turning the torque setting screws 3 inwards or outwards, the position of the adjustment block 23 can be adjusted and thus the torque between the slide block 2 and the slide rail 1 can be preset. In addition, the side portion 22 of each slide block 2 further defines two fixing holes 28 through a projected bottom portion thereof. Each slide block 2 is mounted on one of the two lens barrels 6 (shown in dashed lines in FIG. 1) of the binocular optical device by extending screws through the fixing holes 28 and corresponding holes of the lens barrel 6.

The blocking member 4 in the first embodiment is a friction block engaged with one track portion 11 of the slide rail 1. To prevent the slide block 2 from undesirably further moving along the slide rail 1 so as to maintain the proper distance between the lens barrels for viewing, it is required that the friction force between the slide block 2 and the slide rail 1 should be increased. It is well known that the friction force $F=\mu Fn$, where $\mu$ is the coefficient of friction and $Fn$ is the normal (perpendicular) force between two surfaces in contact. Since the coefficient of friction $\mu$ is constant depending on the two surfaces in contact, the magnitude of the friction force F is directly proportional to the normal force Fn between the two surfaces in contact. Accordingly, to increase the friction force between the slide rail 1 and the slide block 2, the normal force between the slide rail 1 and the slide block 2 must be increased. This may be achieved by exerting sufficient force on the friction block 4. In this way, undesired sliding movement of the slide block 2 along the slide rail 1 can be prevented, and interpupillary distance adjustment purposes can thus be achieved.

Figure 4:
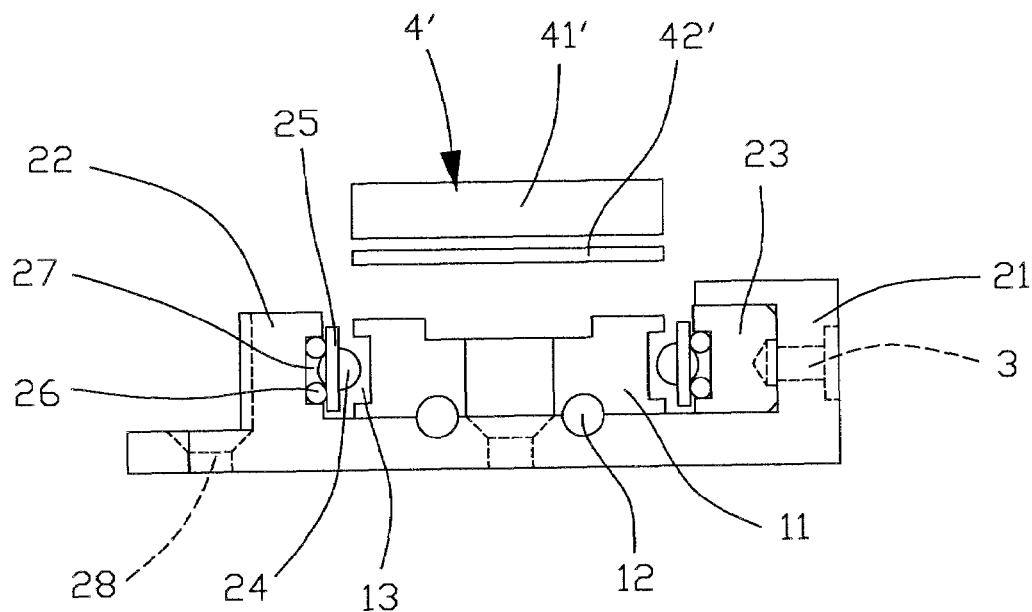
FIG. 4 is a side view showing an interpupillary distance adjustment mechanism for an optical device in accordance with a second embodiment of the present invention.
Figure 5:
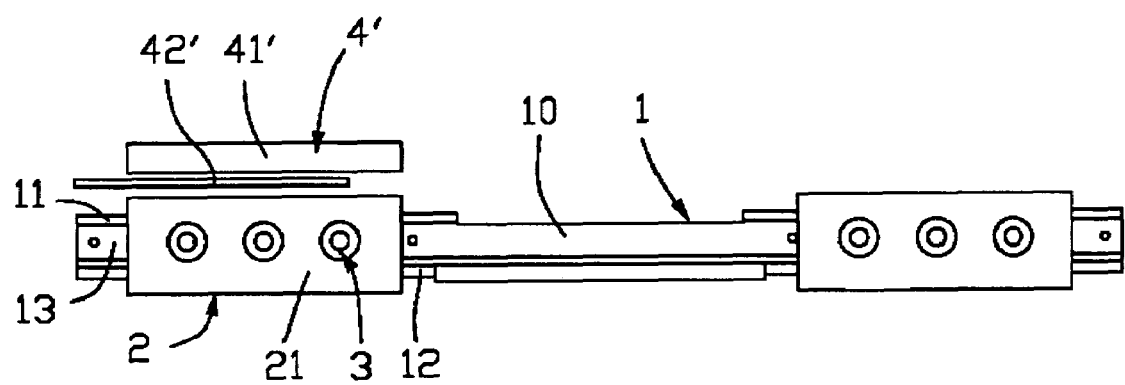
FIG. 5 is a side view of the interpupillary distance adjustment mechanism for an optical device in accordance with the second embodiment of the present invention.

FIGS. 4 and 5 illustrate an interpupillary distance adjustment mechanism for an optical device in accordance with a second embodiment of the present invention. In this embodiment, the blocking member, which is designated with reference numeral 4' for distinction, comprises a magnet 41' disposed above one of the two track portions 11 of the slide rail 1, and an interrupter 42' arranged between the magnet 41' and the track portion 11. The magnet 41' is preferably a strong magnet, such as an Nd—Fe—B magnet. The interrupter 42' is made of non-magnetic materials, such as aluminum, brass or bronze. Alternatively, the interrupter 42' may be a reverse magnet, such as a rubber magnet, which generates reverse magnetic force to partially counteract the strong magnetic force of the magnet 41'. The rubber magnet is made from rubber materials such as cured nitrile rubber as binder containing barium ferrite magnet particles. The rubber magnet is flexible, and uneasy to break and crack against shock. Therefore, it can be manufactured in proper flexibility and cut into any desired size and shape, such as sheets, strips, injection molded tubes etc. The interrupter 42' is configured to be linearly movable as shown in FIG. 5, or rotationally movable. By moving the interrupter 42', the size of the area of the track portion 11 of the slide rail 1 affected by the magnetic force of the magnet 41' is adjusted, and thus the magnetic force applied to the track portion 11 of the slide rail 1 is adjusted. Therefore, the magnitude of the normal force between the contact surfaces of the slide rail 1 and the slide block 2 is changed, and the magnitude of the friction force therebetween is thus adjusted. Consequently, the slide block 2 can be prevented from further sliding along the slide rail 1 to achieve the interpupillary distance adjustment purpose. In addition, the degree of looseness and tightness of the sliding movement of the lens barrels can also be manually adjusted by the user.

As described above in the first and second embodiments, the interpupillary distance adjustment mechanism for an optical device in accordance with the present invention employs the combination of a slide rail 1 and a slide block 2. By the relative movement between the slide rail 1 and the slide block 2, the distance between the two lens barrels 6 of the optical device can be changed, and thus different user interpupillary distances can be accommodated. By further employing a blocking member 4, 4', which is in the form of a friction block 4 or the combination of a magnet 41' and an interrupter 42', to provide the normal force and thus adjust the friction force between the slide rail 1 and the slide block 2 during sliding movement of the slide block 2, further sliding movement of the slide block 2 along the slide rail 1 can be prevented. Accordingly, the distance between the two lens barrels 6 is fixed, and undesired movement of the lens barrels 6 during viewing is thus efficiently prevented.

In the above embodiments, as shown in FIG. 1, although the slide rail 1 is fixed to the middle support 5 of the optical device and the two slide blocks 2 are mounted on the respective lens barrels 6 of the optical device so that the two lens barrels 6 are movable relative to the middle support 5, the present invention is not so limited. Understandably, only one slide block 2 is also operable. In such a case, the slide rail 1 may be mounted on one lens barrel 6, and the slide block 2 may be mounted on the other lens barrel 6, whereby the distance between the two lens barrels 6 can be linearly changed. Such a variation design is not difficult for one skilled in the art. What is more important for the present invention is the use of a blocking member 4, 4', which allows the user to exert force on the slide rail 1 and the slide block 2 to change the friction force therebetween, whereby the adjusted interpupillary distance can be fixed.

The interpupillary distance adjustment mechanism of the present invention can also be employed in other optical devices, such as a binocular telescope, to change the distance between the two lens barrels thereof.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of portions within the principles of the invention to the full extent indicated by the broad general meaning of the terms in which the appended claims are expressed.

What is claimed is:

1. An interpupillary distance adjustment mechanism adapted to use with an optical device that comprises two lens barrels spaced from each other by a distance and a middle support arranged between the lens barrels, the interpupillary distance adjustment mechanism comprising:
   a slide rail adapted to mount on the middle support of the optical device;
   two slide blocks adapted to mount on the lens barrels of the optical device, respectively, the two slide blocks being slidably coupled to the slide rail to selectively move toward and away from each other to change the distance between the two lens barrels of the optical device; and
   a blocking member manually operable to apply an acting force between the slide rail and each slide block to change resistance against the movement of the slide block with respect to the slide rail.

2. The interpupillary distance adjustment mechanism as claimed in claim 1, wherein the blocking member is a friction block touching the slide rail, the friction block being adapted for receiving a pressing force exerted by the user.

3. The interpupillary distance adjustment mechanism as claimed in claim 1, wherein the blocking member comprises a magnet disposed above the slide rail to induce a magnetic force on an area of the slide rail.

4. The interpupillary distance adjustment mechanism as claimed in claim 3, wherein the blocking member further comprises an interrupter disposed between the magnet and the slide rail and movable relative to the magnet to adjust the area of the slide rail on which the magnetic force of the magnet acts.

5. The interpupillary distance adjustment mechanism as claimed in claim 4, wherein the interrupter is made of materials capable of shielding magnetic force lines.

6. The interpupillary distance adjustment mechanism as claimed in claim 5, wherein the interrupter is made of non-magnetic materials.

7. The interpupillary distance adjustment mechanism as claimed in claim 1, wherein the slide rail comprises a middle mounting portion and two track portions at opposite ends of the middle mounting portion.

8. The interpupillary distance adjustment mechanism as claimed in claim 7, wherein the middle mounting portion of the slide rail defines a plurality of mounting holes for extension of screws therethrough, so as to mount the slide rail on the middle support of the optical device.

9. The interpupillary distance adjustment mechanism as claimed in claim 7, wherein each track portion of the slide rail receives a pair of cylindrical guide posts in the bottom thereof and defines a guide slot in each side thereof.

10. The interpupillary distance adjustment mechanism as claimed in claim 9, wherein each slide block is substantially U-shaped, and comprises a recess and a pair of side portions on opposite sides of the recess.

11. The interpupillary distance adjustment mechanism as claimed in claim 10, wherein each slide block defines a pair of receiving slots below the recess for receiving corresponding guide posts therein.

12. The interpupillary distance adjustment mechanism as claimed in claim 11, wherein the inner side of one side portion of each slide block is recessed to receive an adjustment block therein.

13. The interpupillary distance adjustment mechanism as claimed in claim 12, further comprising a plurality of torque setting screws screwed through said one side portion of each slide block to contact with a corresponding adjustment block.

14. The interpupillary distance adjustment mechanism as claimed in claim 13, wherein each of the inner sides of the adjustment block and the other side portion of each slide block defines an engaging slot therein, the engaging slot respectively receiving a pair of slide bars in upper and lower ends thereof.

15. The interpupillary distance adjustment mechanism as claimed in claim 14, further comprising a positioning member positioned between the engaging slot of the slide block and the corresponding guide slot of the guide rail, and a plurality of rolling balls received in the positioning member.

16. The interpupillary distance adjustment mechanism as claimed in claim 15, wherein each rolling ball has one side thereof engaged between a corresponding pair of slide bars in the engaging slot and has the other side thereof received in a corresponding guide slot of the slide rail.

17. An optical device employing the interpupillary distance adjustment mechanism as claimed in claim 1.

18. An interpupillary distance adjustment mechanism adapted to use with an optical device comprising first and second lens barrels spaced from each other by a distance, the interpupillary distance adjustment mechanism comprising:
   a slide rail adapted to mount on the first lens barrel of the optical device;
   a slide block adapted to mount on the second lens barrel of the optical device, the slide block being slidable along the slide rail to change the distance between the lens barrels of the optical device; and
   a blocking member manually operable to apply an acting force between the slide rail and the slide block to change resistance against the movement of the slide block with respect to the slide rail.

19. The interpupillary distance adjustment mechanism as claimed in claim 18, wherein the blocking member is a friction block touching the slide rail, the friction block being adapted to receive a pressing force exerted by a user.

20. The interpupillary distance adjustment mechanism as claimed in claim 18, wherein the blocking member comprises a magnet disposed above the slide rail to induce a magnetic force on an area of the slide rail.

21. The interpupillary distance adjustment mechanism as claimed in claim 20, wherein the blocking member further comprises an interrupter disposed between the magnet and the slide rail and movable relative to the magnet to adjust the area of the slide rail on which the magnetic force of the magnet acts.

22. The interpupillary distance adjustment mechanism as claimed in claim 21, wherein the interrupter is made of materials capable of shielding magnetic force lines.

23. An optical device employing the interpupillary distance adjustment mechanism as claimed in claim 18.

24. An interpupillary distance adjustment mechanism adapted to use with an optical device comprising first and second lens barrels spaced from each other by a distance, the interpupillary distance adjustment mechanism comprising:
   a slide rail mounted on the optical device;
   a slide block being slidable along the slide rail to change the distance between the lens barrels of the optical device; and
   a blocking member manually operable to apply an acting force between the slide rail and the slide block to change resistance against the movement of the slide block with respect to the slide rail.

25. An optical device employing the interpupillary distance adjustment mechanism as claimed in claim 24.

* * * * *